(12) United States Patent
Zhou (10) Patent No.: US 10,970,596 B2
(45) Date of Patent: Apr. 6, 2021

(54) LOGISTIC REGRESSION GRADIENT CALCULATION METHOD AND APPARATUS

(71) Applicant: ALIBABA GROUP HOLDING LIMITED, Grand Cayman (KY)

(72) Inventor: Jun Zhou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 169 days.

(21) Appl. No.: 16/043,043

(22) Filed: Jul. 23, 2018

(65) Prior Publication Data

US 2018/0330191 A1 Nov. 15, 2018

Related U.S. Application Data

(63) Continuation of application No. PCT/CN2017/071130, filed on Jan. 13, 2017.

(30) Foreign Application Priority Data

Jan. 22, 2016 (CN) .......................... 201610045655.X (51) Int. Cl.
*G06F 16/00* (2019.01)
*G06K 9/62* (2006.01)
(Continued)

(52) U.S. Cl.
CPC ............ *G06K 9/6221* (2013.01); *G06F 17/18* (2013.01); *G06K 9/00973* (2013.01);
(Continued)

(58) Field of Classification Search
CPC .. G06K 9/6221; G06K 9/6217; G06K 9/6256; G06K 9/00973; G06K 9/6288;
(Continued)

(56) References Cited

U.S. PATENT DOCUMENTS

2009/0248595 A1 10/2009 Lu et al.
2013/0054566 A1\* 2/2013 Xu ...................... G06F 16/9535
  707/713
2019/0043076 A1\* 2/2019 Dong ..................... G06N 20/00

FOREIGN PATENT DOCUMENTS

CN 103745225 A 4/2014
CN 103996088 A \* 8/2014
(Continued)

OTHER PUBLICATIONS

Yi et al, English translation of CN103996088A, pp. 1-6 (Year: 2014).\*
(Continued)

*Primary Examiner* — Alexander Khong
(74) *Attorney, Agent, or Firm* — Finnegan, Henderson, Farabow, Garrett & Dunner, LLP (57) ABSTRACT

The present disclosure provides logistic regression gradient calculation methods and apparatuses. One exemplary calculation method comprises: acquiring training data, the training data including X-row user data and Y-row click-through data corresponding to the X-row user data; converting the X-row user data into X-column data; segmenting the X-column data and a weight vector to form N X-column data segmentation blocks and N weight vector segmentation blocks; starting N threads respectively to generate N sub-logistic regression gradients according to the N X-column data segmentation blocks, the N weight vector segmentation blocks, and the corresponding Y-row click-through data; and splicing the N sub-logistic regression gradients to form a full logistic regression gradient. With embodiments of the present disclosure, a computing machine can support training of a super-large-scale logistic regression model, which
(Continued)

increases the calculation speed, shortens the training time, and greatly reduces the memory usage of the computing machine.

12 Claims, 5 Drawing Sheets

(51) Int. Cl.
  *G06F 17/18* (2006.01)
  *G06K 9/00* (2006.01)
  *G06N 20/00* (2019.01)
  *G06Q 30/02* (2012.01)
(52) U.S. Cl.
  CPC ......... *G06K 9/6217* (2013.01); *G06K 9/6256* (2013.01); *G06K 9/6288* (2013.01); *G06N 20/00* (2019.01); *G06Q 30/0277* (2013.01); *G06Q 30/0242* (2013.01)
(58) Field of Classification Search
  CPC ............... G06N 20/00; G06Q 30/0277; G06Q 30/0242; G06F 17/18
  See application file for complete search history.

(56) References Cited

FOREIGN PATENT DOCUMENTS

| | | |
|---|---|---|
| CN | 104536983 A | 4/2015 |
| CN | 105045819 A | 11/2015 |
| JP | H 0581310 | 4/1993 |

OTHER PUBLICATIONS

Dave et al.,"Learning the Click-Through Rate for Rare/New Ads from Similar Ads", AMC 978-1-60558-896-4/10/07, pp. 897-898 ( Year: 2010).*
Joachims et al., "Optimizing Search Engines using Clickthrough Data", ACM 1-58113-567-X/02/0007, pp. 133-142 (Year: 2002).*
First Search Report issued in related Chinese Application No. 201610045655X, dated Sep. 9, 2019 (1 pg.).
International Search Report and Written Opinion issued by the International Searching Authority in related PCT Application No. PCT/CN2017/071130, dated Mar. 30, 2017 (8 pgs.).

* cited by examiner

LOGISTIC REGRESSION GRADIENT CALCULATION METHOD AND APPARATUS

This application claims priority to International Application No. PCT/CN2017/071130, filed on Jan. 13, 2017, which claims priority to and the benefits of priority to Chinese Application No. 201610045655.X, filed on Jan. 22, 2016, both of which are incorporated herein by reference in their entireties.

TECHNICAL FIELD

The present disclosure generally relates to the field of internet technologies, and in particular, to logistic regression gradient calculation methods and apparatuses.

BACKGROUND

Logistic regression is a widely used model for network advertising Click-Through Rate (CTR) predictions. Whoever can train a logistic regression model in a limited time is able to provide users with more tailored information, thereby improving user experience.

The most critical part in the process of training a logistic regression model is the calculation of gradients. An existing gradient calculation method is accelerating by starting multiple threads on a computing machine. However, each thread requires a full gradient vector to be stored in the memory. In other words, if ten threads are started on a computing machine to calculate a gradient, suppose that one part of a gradient vector is one billion and is all double data, one thread will consume a memory of about 7.5 G, and the ten threads will consume a total memory of 75 G of the computing machine. This can be unbearable for existing computing machines.

Further, in the field of internet technologies, to increase the network CTR and meet the users' needs, more training data and larger features are required to depict long tails. For example, a user's demand can be depicted more effectively if the user's gender, age, current location, and other fine-grained features are taken into account when training a logistic regression model. That way, the user's individualized demand can be better met. However, it is very difficult to train such a large logistic regression model by using existing technologies.

SUMMARY

The present disclosure provides technical solutions to address the above problems. According to some embodiments of the present disclosure, logistic regression gradient calculation methods are provided. One objective of the proposed calculation methods is to enable a computing machine to support training of a super-large-scale logistic regression model, increase the calculation speed, and reduce the training time and the memory usage of the computing machine. Further, according to some embodiments of the present disclosure, logistic regression gradient calculation apparatuses are provided.

According to some embodiments of the present disclosure, one exemplary logistic regression gradient calculation method comprises: acquiring training data, wherein the training data includes X-row user data and Y-row click-through data, and the Y-row click-through data corresponds to the X-row user data; converting the X-row user data into X-column data; segmenting the X-column data and a weight vector to form N X-column data segmentation blocks and N weight vector segmentation blocks; starting N threads respectively to generate N sub-logistic regression gradients according to the N X-column data segmentation blocks, N weight vector segmentation blocks, and the corresponding Y-row click-through data; and splicing the N sub-logistic regression gradients to form a full logistic regression gradient.

According to some calculation method embodiments, the training data and the weight vector can be segmented into multiple small regions that can be stored in a memory. A corresponding number of threads can be started to calculate with respect to the small regions in parallel. That way, the computing machine can support training of a super-large-scale logistic regression model, which can increase the calculation speed, and reduce the training time and the memory usage of the computing machine.

According to some embodiments of the present disclosure, logistic regression gradient calculation apparatuses are provided. One exemplary apparatus comprises: an acquisition module configured to acquire training data, wherein the training data includes X-row user data and Y-row click-through data, and the Y-row click-through data corresponds to the X-row user data; a conversion module configured to convert the X-row user data into X-column data; a segmentation module configured to segment the X-column data and a weight vector to form N X-column data segmentation blocks and N weight vector segmentation blocks; a generation module configured to start N threads respectively to generate N sub-logistic regression gradients according to the N X-column data segmentation blocks, N weight vector segmentation blocks, and the corresponding Y-row click-through data; and a splicing module configured to splice the N sub-logistic regression gradients to form a full logistic regression gradient.

According to the calculation apparatus embodiments of the present disclosure, the training data and the weight vector can be segmented into multiple small regions that can be stored in a memory. A corresponding number of threads can be started to calculate with respect to the small regions in parallel. That way, the computing machine can support training of a super-large-scale logistic regression model, which can increase the calculation speed, shorten the training time, and greatly reduce the memory usage of the computing machine.

Details and advantages of the embodiments provided in the present disclosure are provided in the following description. Different aspects of the technical solutions provided herein can be appreciated based on the following description, or through implementation of the present disclosure.

BRIEF DESCRIPTION OF THE DRAWINGS

The foregoing and additional aspects and advantages of the present disclosure will be further illustrated in the following description with reference to the accompanying drawing.

DETAILED DESCRIPTION

Some exemplary embodiments of the present disclosure are described in detail in the following, and are illustrated in the drawings. The same or similar reference numbers may represent the same or similar elements, or elements having the same or similar functions. It is appreciated that the following described embodiments and those illustrated in the drawings are exemplary and are only used to explain the present disclosure. They do not constitute any limit on the scope of the present disclosure.

In addition, the terms "first," "second" and the like used herein are merely for the purpose of description. They are not intended to indicate or imply relative importance or a set number of the described technical features included therein. Thus, the feature labeled or described as "first" or "second" may explicitly or implicitly include more the features described therein. In the following description of the present disclosure, "more" could mean two or more, unless otherwise definitely and specifically defined.

Further, any process or method described in the flowcharts or in other manners here can be understood as a module, fragment, or part of program codes including executable instructions for implementing logic functions or process steps consistent with the embodiments of the present disclosure. It should be appreciated that, based on the present disclosure, the functions, steps, or modules in the embodiments of the present disclosure can also be implemented in an order different from that described herein or can be implemented simultaneously.

In some embodiments, a logistic regression calculation formula can be as follows:

$$P(y|x,w)=1/(1+\exp(-wx)).$$

wherein w represents a weight vector, and x represents training data. A user's click-through probability can be predicted according to the foregoing formula. When a logistic regression model is trained according to a gradient descent algorithm, a gradient calculation formula can be as follows:

$$1/(1+\exp(ywx))*y*x.$$

wherein y represents the user's click-through result. As a log is obtained after operation of the user, in the above formula, if user clicked, then y=1; if the user did not click, y=−1.

In existing techniques, multiple threads are started, and each thread has a gradient vector g similar to the weight vector w, wherein a gradient of an $i^{th}$ coordinate can be represented as follows:

$$g_i = \Sigma_{s1}^{sn}(1/(1+\exp(ywx))*y*x_i).$$

wherein s1 is the first training data, and sn is the nth training data. Each thread traverses all training data associated with the thread to obtain a complete gradient vector gi. Then, calculation results of all the threads can be merged to obtain a final gradient vector g.

However, the existing techniques have at least the following defect. For large-scale features, the memory required by each computing machine corresponds to the number of threads*the weight vector w. As a result, the consumption of an enormous amount of memory of the computing machine is required. It can be impossible for a single computing machine to load and train the logistic regression model. In addition, the problem cannot be addressed by using more CPUs for the calculation, because more memory of the computing machine is consumed when more CPUs are used. As a result, the training speed can be very slow, and the training cost is relatively large.

According to some logistic regression gradient calculation method embodiments in the present disclosure, the training data and the weight vector can be segmented into multiple smaller regions that can be stored in a memory. Calculation can be performed in parallel with respect to the multiple regions. That way, the calculation speed can be increased, the training time can be shortened, and the memory usage of the computing machine can be greatly reduced.

In some embodiments, the weight vector and the training data can be segmented by columns during gradient calculation. Each thread can calculate a part of the segmented weight columns and corresponding data columns. Thus, each thread only needs to hold different regions of the gradient. Therefore, the memory of the computing machine consumed by the gradient calculation can be changed to 1 portion from the original N portions (N portions of the memory of the computing machine are consumed when N CPUs are used; for example, N=10 if the computing machine uses 10 CPUs in the gradient calculation), thus greatly reducing the consumption of the memory of the computing machine. In terms of calculation speed, instead of starting only several threads at most, a number of threads can be started corresponding to the number of CPUs that are used, which is not limited by the memory of the computing machine. Therefore, the CPU utilization rate of the computing machine can be increased.

Based on the above, training of a super-large-scale logistic regression model can be performed. At the same time, as training of the logistic regression model is not limited by the memory and the CPUs of the computing machine, more resources can be used to speed up the training process. Therefore, the training time can be shortened and costs can be reduced. In other words, the logistic regression gradient calculation methods provided in the present disclosure not only can reduce the training costs, but also can achieve training of a super-large-scale logistic regression model. Accordingly, long tail requirements can be depicted more effectively and the user's individualized demand can be better met.

Figure 1:
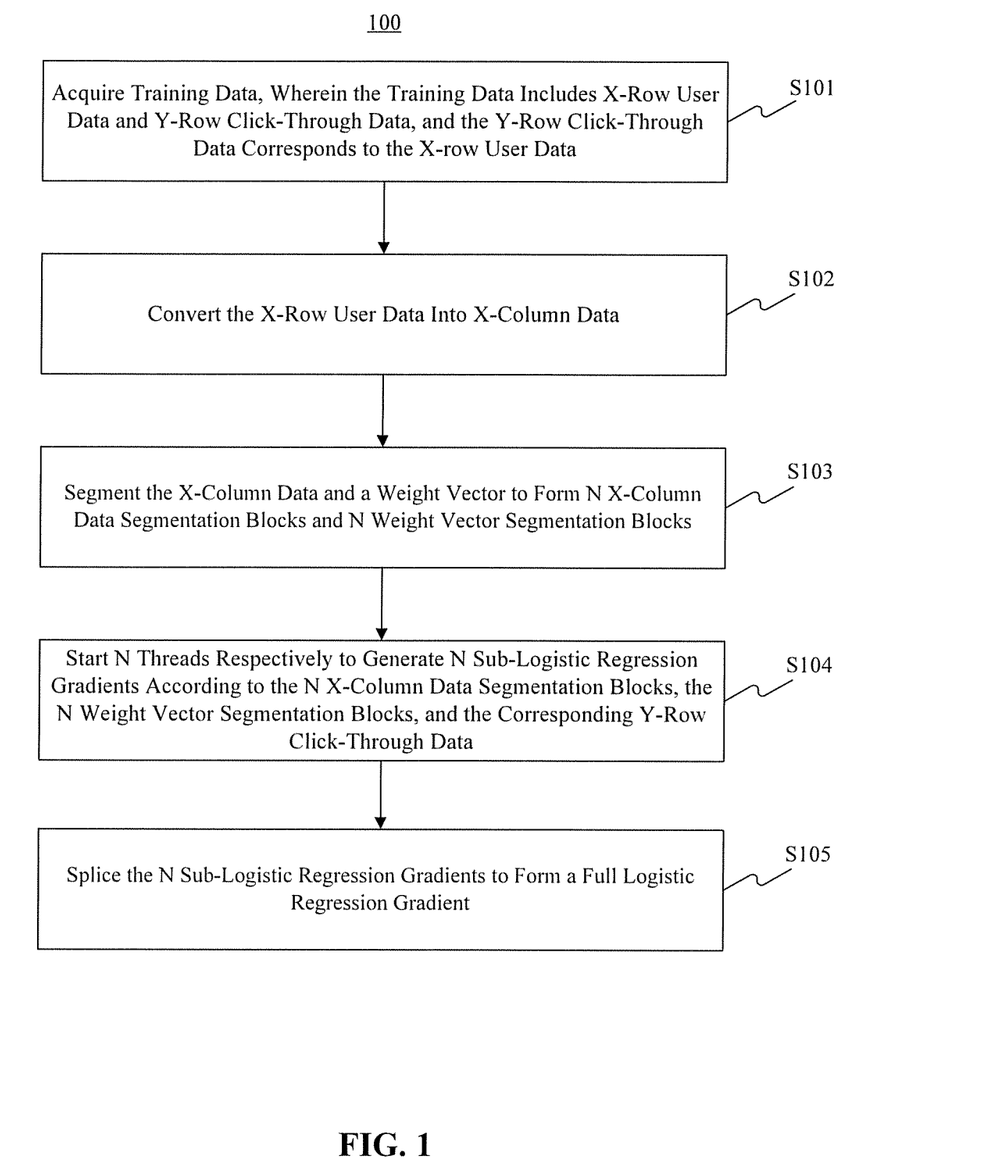
FIG. 1 is a flowchart of an exemplary logistic regression gradient calculation method according to some embodiments of the present disclosure.

FIG. 1 is a flowchart of an exemplary logistic regression gradient calculation method 100 according to some embodiments of the present disclosure. As shown in FIG. 1, the exemplary calculation method 100 can include the following steps S101-S105.

In step S101, training data is acquired. The training data can include X-row user data and Y-row click-through data. The Y-row click-through data corresponds to the X-row user data.

For example, user data can be input in the following format:

X:[1.3.5.8.9.10.23.22

2.4.6.8.9.12.34.56

...

1.3.6.8.10.11.12].

In the above example, the first row is first user data X, and 1.3.5.8.9.10.23.22 represents different user features in the first user data X. The second row is second user data X, and 2.4.6.8.9.12.34.56 represents different user features in the second user data X. The $N^{th}$ row is $N^{th}$ user data X, and 1.3.6.8.10.11.12 represents different user features in the $N^{th}$ user data X.

Then, click-through data can be input in the following format:

$X$:[1.0.0.0

2.0.0.0

...

0.0.1.0].

In the above example, the first row is first click-through data Y; the second row is second click-through data Y; and the $N^{th}$ row is $N^{th}$ click-through data.

It is appreciated that, first complete training data includes the first user data X in the first row and the first click-through data Y in the first row. Second complete training data includes the second user data X in the second row and the second click-through data Y in the second row. Similarly, $N^{th}$ complete training includes the $N^{th}$ user data X in the $N^{th}$ row and the $N^{th}$ click-through data Y in the $N^{th}$ row.

In step S102, the X-row user data can be converted into X-column data. For example, the X-row user data can be converted into X-column data by using a column data conversion apparatus.

In step S103, the X-column data and a weight vector can be segmented to form N X-column data segmentation blocks and N weight vector segmentation blocks.

For example, the X-column data can be segmented by using a column segmentation apparatus to obtain corresponding N X-column data segmentation blocks. For example, if N=3, the X-column data can be segmented into three X-column data segmentation blocks. The three X-column data segmentation blocks are respectively:

$X1$:[1.3.5  $X2$:[8.9  $X3$:[10.23.22

2.4.6     8.9      12.34.56

...       ...      ...

1.3.6]    8]       10.11.12]

Figure 2:
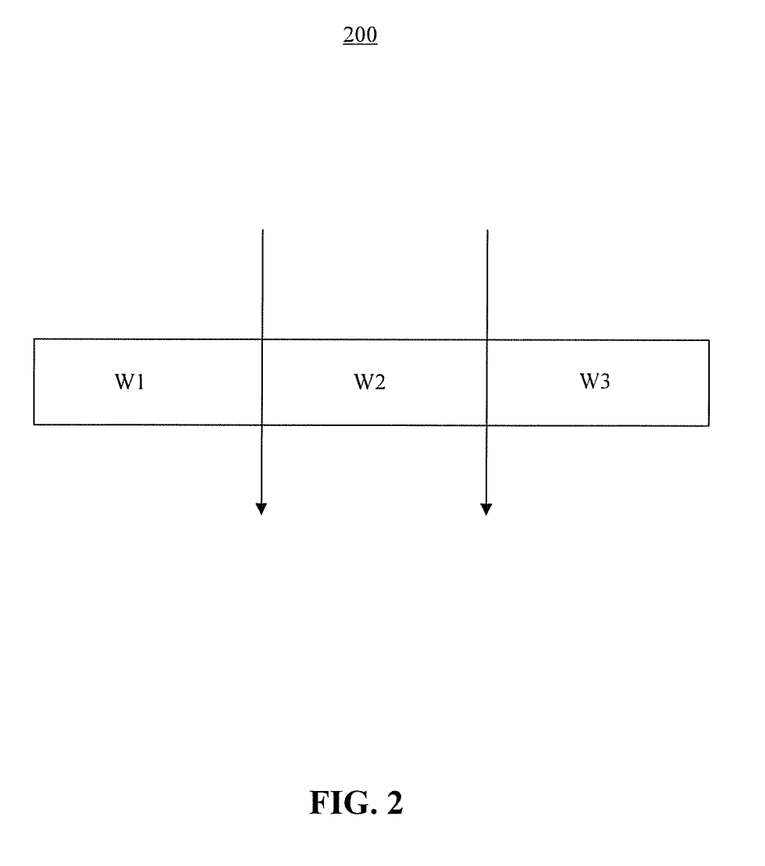
FIG. 2 is a schematic diagram illustrating segmenting a weight vector W by using a column segmenting apparatus according to some embodiments of the present disclosure.

As shown in FIG. 2, the weight vector W can be segmented by using a column segmentation apparatus to obtain corresponding weight vector segmentation blocks. For example, W1 corresponds to elements with subscripts 1-7 in W, W2 corresponds to elements with subscripts 8-9 in W, and W3 corresponds to elements with subscripts 10-56 in W.

In some embodiments of the present application, the number of columns in the X-row user data can be the same as the vector width of the weight vector W. In other words, the number of columns in the X-row user data is as wide as the weight vector W. For example, if the length of the weight vector W is 100, the biggest element appearing in each row of user data in the X-row user data is also 100. Accordingly, each row of user data in the X-row user data is sparse. That is, each user data only includes a part of the features. For example, for male users in Hunan and female users in Beijing, features of Hunan and male appear in the former, and features of Beijing and female appear in the latter. When they correspond to two rows of user data in the X-row user data, the first row may be 1.7, and the second row may be 9.10. There are also two columns of Y in the X-row user data, the first column of Y may be clicked, and the second column of Y may be not clicked.

In step S104, N threads are started respectively to generate N sub-logistic regression gradients according to the N X-column data segmentation blocks, N weight vector segmentation blocks, and the corresponding Y-row click-through data.

In some embodiments of the present application, N can be the number of CPUs callable in a computing machine, and each CPU can call a thread.

For example, each thread of the N threads in the computing machine that are started can obtain a weight vector segmentation block corresponding to the thread and a corresponding X-column data segmentation block. For example, a thread 1 corresponds to X1/W1, a thread 2 corresponds to X2/W2, and a thread 3 corresponds to X3/W3. Then, each thread can perform calculation in parallel. Corresponding logistic regression gradients $g_1$, $g_2$ and $g_3$ can be calculated respectively, according to, for example, the gradient calculation formula described above.

In step S105, the N sub-logistic regression gradients can be spliced to form a full logistic regression gradient.

In some embodiments, the logistic regression gradients $g_1$, $g_2$ and $g_3$ obtained by calculation can be merged. That is, the sum of the logistic regression gradients $g_1$, $g_2$ and $g_3$ can be calculated to obtain a full logistic regression gradient g of the computing machine.

According to the above described calculation methods according to embodiment of the present disclosure, the training data and the weight vector can be segmented into multiple small regions that can be stored in a memory. A corresponding number of threads can be started to calculate the small regions in parallel. That way, the computing machine can support training of a super-large-scale logistic regression model, which increases the calculation speed, shortens the training time, and greatly reduces the memory usage of the computing machine.

Figure 3:
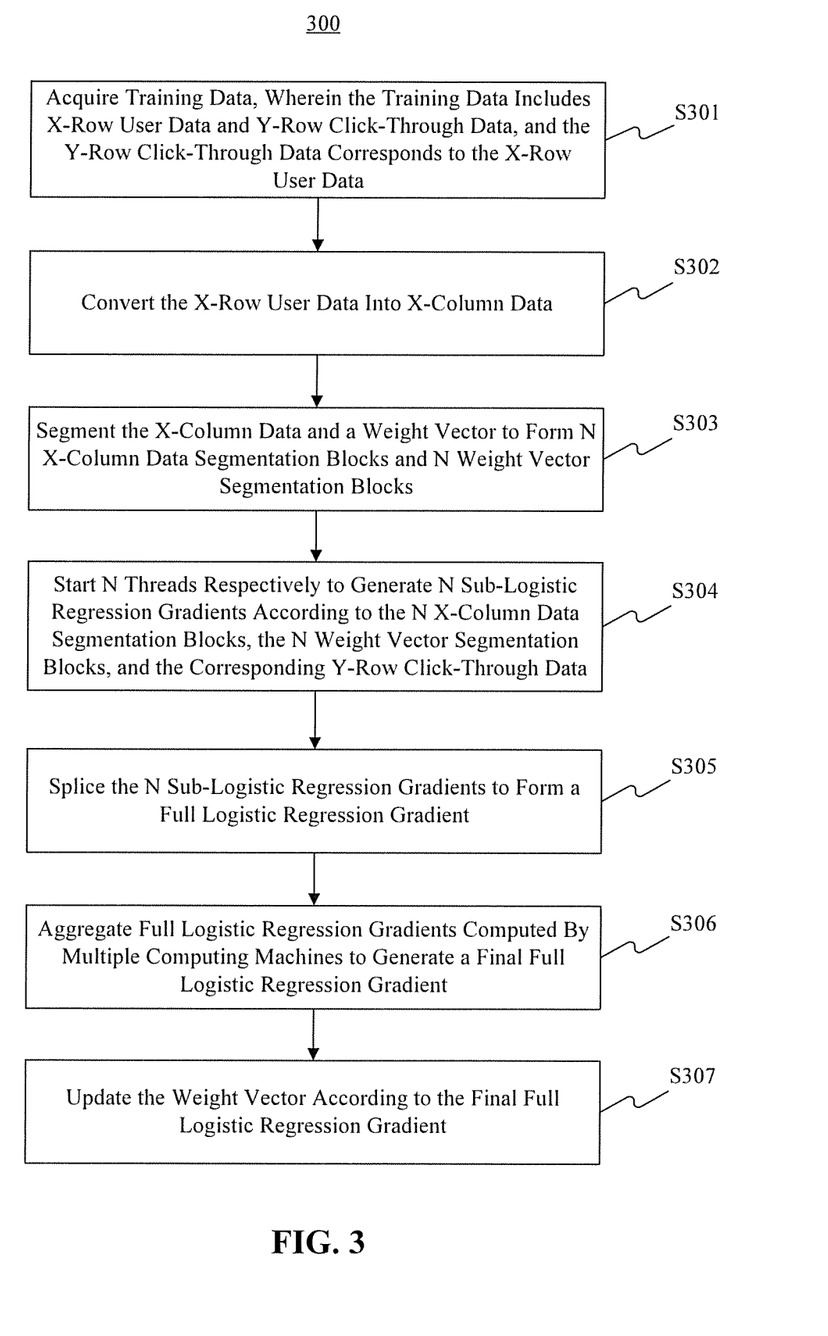
FIG. 3 is a flowchart of an exemplary logistic regression gradient calculation method according to some embodiments of the present disclosure.

FIG. 3 is a flowchart of an exemplary logistic regression gradient calculation method 300 according to some embodiments of the present disclosure. As shown in FIG. 3, the calculation method 300 can include the following steps S301-S307.

In step S301, training data can be acquired. The training data can include X-row user data and Y-row click-through data. The Y-row click-through data corresponds to the X-row user data. For example, user data can be input in the following format:

$X$:[1.3.5.8.9.10.23.22

2.4.6.8.9.12.34.56

...

1.3.6.8.10.11.12].

In this example, the first row is first user data X, and 1.3.5.8.9.10.23.22 represents different user features in the first user data X. The second row is second user data X, and 2.4.6.8.9.12.34.56 represents different user features in the second user data X. The $N^{th}$ row is $N^{th}$ user data X, and 1.3.6.8.10.11.12 represents different user features in the $N_{th}$ user data X.

Click-through data can be input in the following format:

$$Y:[1.0.0.0$$
$$2.0.0.0$$
$$...$$
$$0.0.1.0].$$

In this example, the first row is first click-through data Y; the second row is second click-through data Y; and the $N^{th}$ row is $N^{th}$ click-through data.

It is appreciated that, first complete training data is formed by merging the first user data X in the first row with the first click-through data Y in the first row. Second complete training data is formed by merging the second user data X in the second row with the second click-through data Y in the second row. $N^{th}$ complete training data is formed by merging the $N^{th}$ user data X in the $N^{th}$ row with the $N^{th}$ click-through data Y in the $N^{th}$ row.

In step S302, the X-row user data can be converted into X-column data. In some embodiments, the X-row user data can be converted into X-column data by using a column data conversion apparatus.

In step S303, the X-column data and a weight vector can be segmented to form N X-column data segmentation blocks and N weight vector segmentation blocks. In some embodiments, the X-column data can be segmented by using a column segmentation apparatus to obtain corresponding N X-column data segmentation blocks. For example, N=3, i.e., the X-column data can be segmented into three X-column data segmentation blocks. The three X-column data segmentation blocks can be as follows respectively:

$$X1:[1.3.5 \quad X2:[8.9 \quad X3:[10.23.22$$
$$2.4.6 \quad\quad 8.9 \quad\quad 12.34.56$$
$$... \quad\quad ... \quad\quad ...$$
$$1.3.6] \quad\quad 8] \quad\quad 10.11.12]$$

As shown in FIG. 2, the weight vector W can be segmented by using a column segmentation apparatus to obtain corresponding weight vector segmentation blocks. For example, in FIG. 2, W1 corresponds to elements with subscripts 1-7 in W, W2 corresponds to elements with subscripts 8-9 in W, and W3 corresponds to elements with subscripts 10-56 in W.

In some embodiments of the present application, the number of columns in the X-row user data is the same as the vector width of the weight vector W. In other words, the number of columns in the X-row user data is as wide as the weight vector W. For example, if the length of the weight vector W is 100, the biggest element appearing in each row of user data in the X-row user data is also 100. Accordingly, each row of user data in the X-row user data is sparse. That is, each user data can only include a part of features. For example, for male users in Hunan and female users in Beijing, features of Hunan and male appear in the former, and features of Beijing and female appear in the latter. When they correspond to two rows of user data in the X-row user data, the first row may be 1.7, and the second row may be 9.10. There are also two columns of Y in the X-row user data, the first column of Y may represent clicked, and the second column of Y may represent not clicked.

In step S304, N threads can be started respectively to generate N sub-logistic regression gradients, according to the N X-column data segmentation blocks, N weight vector segmentation blocks, and the corresponding Y-row click-through data. In some embodiment of the present application, N can be the number of CPUs callable in a computing machine, and each CPU can call a thread.

In some embodiments, each thread of the N threads in the computing machine that are started can obtain a weight vector segmentation block corresponding to the thread and a corresponding X-column data segmentation block. For example, a thread 1 corresponds to X1/W1, a thread 2 corresponds to X2/W2, and a thread 3 corresponds to X3/W3. Then, each thread can perform calculation in parallel. Corresponding logistic regression gradients $g_1$, $g_2$ and $g_3$ can be calculated respectively according to the gradient calculation formula described above.

In step S305, the N sub-logistic regression gradients can be spliced to form a full logistic regression gradient. In some embodiments, the logistic regression gradients $g_1$, $g_2$ and $g_3$ obtained by calculation can be merged. That is, the sum of the logistic regression gradients $g_1$, $g_2$ and $g_3$ is calculated to obtain a full logistic regression gradient g of the computing machine.

In step S306, full logistic regression gradients computed by multiple computing machines can be aggregated to generate a final full logistic regression gradient. In some embodiments, there can be multiple computing machines for calculating full logistic regression gradients. The full logistic regression gradients calculated by all the computing machines can be collected and combined. That is, the full logistic regression gradients calculated by all the computing machines are added together.

In step S307, the weight vector can be updated according to the final full logistic regression gradient. In some embodiments, the weight vector is calculated according to the following formula:

Weight vector in the T+1 round=weight vector W in the T round+step length*full logistic regression gradient g.

In the above formula, the step length is a floating-point number, for example, 0.01.

According to the above-described calculation method embodiments of the present disclosure, the training data and the weight vector can be segmented into multiple small regions that can be stored in a memory. A corresponding number of threads can be started to calculate the small regions in parallel. Then the full logistic regression gradients calculated by the computing machines can be aggregated, which can thus further increase the calculation speed and shorten the training time.

Figure 4:
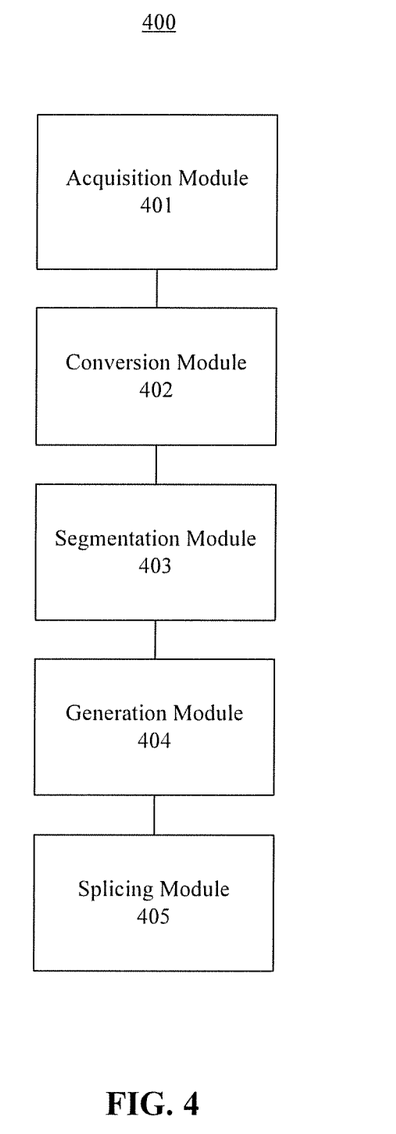
FIG. 4 is a schematic structural diagram of an exemplary logistic regression gradient calculation apparatus some embodiments of the present disclosure.

According to some embodiments of the present disclosure, logistic regression gradient calculation apparatuses are provided. FIG. 4 is a schematic structural diagram of an exemplary logistic regression gradient calculation apparatus 400 according to some embodiments of the present disclosure. As shown in FIG. 4, the calculation apparatus 400 includes an acquisition module 401, a conversion module 402, a segmentation module 403, a generation module 404, and a splicing module 405.

The acquisition module 401 can be configured to acquire training data. The training data can include X-row user data and Y-row click-through data. The Y-row click-through data corresponds to the X-row user data.

The conversion module 402 can be configured to convert the X-row user data into X-column data.

The segmentation module 403 can be configured to segment the X-column data and a weight vector to form N X-column data segmentation blocks and N weight vector segmentation blocks. N can be the number of CPUs callable in a computing machine, and the number of columns in the X-row user data can be the same as the vector width of the weight vector.

The generation module 404 can be configured to start N threads respectively to generate N sub-logistic regression gradients according to the N X-column data segmentation blocks, N weight vector segmentation blocks, and the corresponding Y-row click-through data.

The splicing module 405 can be configured to splice the N sub-logistic regression gradients to form a full logistic regression gradient.

It should be appreciated that the modules in the logistic regression gradient calculation apparatus 400 can perform similar processes as described above with respect to the method embodiments. Reference can be made to the description above regarding the corresponding steps in the method embodiments, details of which is not repeated herein.

According to the above-described calculation apparatus embodiments of the present disclosure, the training data and the weight vector can be segmented into multiple small regions that can be stored in a memory. A corresponding number of threads can be started to calculate the small regions in parallel. That way, the computing machine can support training of a super-large-scale logistic regression model, which can increase the calculation speed, shorten the training time, and greatly reduce the memory usage of the computing machine.

Figure 5:
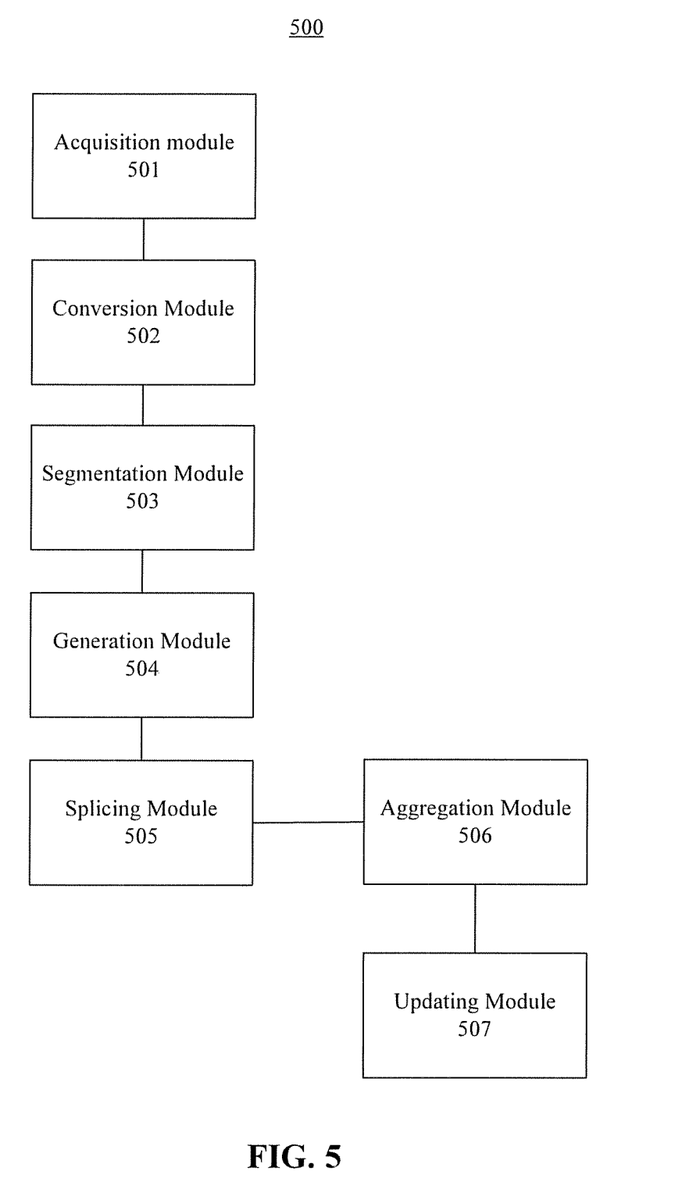
FIG. 5 is a schematic structural diagram of an exemplary logistic regression gradient calculation apparatus according to some embodiments of the present disclosure.

FIG. 5 is a schematic structural diagram of a logistic regression gradient calculation apparatus 500 according to some embodiments of the present disclosure. As shown in FIG. 5, the calculation apparatus 500 includes an acquisition module 501, a conversion module 502, a segmentation module 503, a generation module 504, a splicing module 505, an aggregation module 506, and an updating module 507.

The acquisition module 501, the conversion module 502, the segmentation module 503, the generation module 504, and the splicing module 505 can be configured to perform similar processes to the acquisition module 401, the conversion module 402, the segmentation module 403, the generation module 404, and the splicing module 405 described above in the exemplary apparatus 400 with reference to FIG. 4.

The aggregation module 506 can be configured to aggregate full logistic regression gradients computed by the machines to generate a final full logistic regression gradient.

The updating module 507 can be configured to update the weight vector according to the final full logistic regression gradient.

It is appreciated that, the foregoing explanations of the logistic regression gradient calculation method embodiments are also applicable to the exemplary logistic regression gradient calculation apparatus 500. The implementation principles are similar, which will not be described in detail here.

According to the above described calculation apparatus embodiments of the present disclosure, the training data and the weight vector can be segmented into multiple small regions that can be stored in a memory. A corresponding number of threads can be started to calculate the small regions in parallel. The full logistic regression gradients calculated by the computing machines can be aggregated, which can thus further increase the calculation speed and shorten the training time.

It should be appreciated that, various parts of the present disclosure may be implemented by using hardware, software, firmware, or a combination thereof. In the above examples, one or more of the steps or modules may be implemented by software or firmware stored in a memory and executed by a suitable instruction executing system. For example, if certain steps or modules are implemented by using hardware, they may be implemented by using any of the following technologies or a combination thereof: a discrete logic circuit having a logic gate circuit for implementing a logic function on a data signal, a specific integrated circuit having a suitable combined logic gate circuit, a programmable gate array (PGA), a field programmable gate array (FPGA), and the like.

Moreover, the embodiments of the present disclosure may be in the form of a computer program product implemented on one or more computer usable storage media (including, but not limited to, a magnetic disk memory, a CD-ROM, an optical memory, and the like) including computer-readable program codes therein. The storage media can include a set of instructions for instructing a computer device (which may be a personal computer, a server, a network device, a mobile device, or the like) or a processor to perform a part of the steps of the methods described in the embodiments of the present disclosure. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

In the description herein, the descriptions about the reference terms "an embodiment," "some embodiments," "an example," "a specific example," "some examples" and the like mean that specific features, structures, materials or characteristics described in combination with the embodiment(s) or example(s) are included in at least one embodiment or example of the present disclosure. In the description, schematic expressions of the above terms do not necessarily refer to the same embodiment or example. Moreover, the features, structures, materials or characteristics described above may be combined in a suitable manner in other embodiments or examples. In addition, in the absence of contradiction, those skilled in the art can combine different embodiments or examples described herein, or combine features described in different embodiments or examples.

Exemplary embodiments of the present disclosure are described above. It is appreciated that the above embodiments are exemplary and cannot be construed as limitations on the scope of the present disclosure. Those of ordinary skill in the art may change, modify, replace and transform one or more parts of the above embodiments, consistent with present disclosure. Such changes, modifications, replacements, or transformations shall also fall within the scope of the present disclosure.

The invention claimed is:

1. A logistic regression gradient calculation method performed by a computing machine, the method comprising:
   acquiring training data including X-row user data and Y-row click-through data corresponding to the X-row user data;
   converting the X-row user data into X-column data;
   segmenting the X-column data and a weight vector to form N X-column data segmentation blocks and N weight vector segmentation blocks, wherein N corresponds to a number of CPUs callable in the computing machine;
   starting N threads to generate N sub-logistic regression gradients according to the N X-column data segmentation blocks, the N weight vector segmentation blocks, and the Y-row click-through data; and
   splicing the N sub-logistic regression gradients to form a full logistic regression gradient.

2. The logistic regression gradient calculation method according to claim 1, wherein the computing machine comprises a plurality of computing machines, the method further comprising:
   aggregating full logistic regression gradients computed by the plurality of computing machines to generate a final full logistic regression gradient.

3. The logistic regression gradient calculation method according to claim 2, further comprising:
   updating the weight vector according to the final full logistic regression gradient.

4. The logistic regression gradient calculation method according to claim 1, wherein a number of columns in the X-row user data corresponds to a width of the weight vector.

5. A logistic regression gradient calculation apparatus, comprising:
   a memory storing a set of instructions; and
   a processor configured to execute the set of instructions to cause the logistic regression gradient calculation apparatus to perform:
   acquiring training data including X-row user data and Y-row click-through data corresponding to the X-row user data;
   converting the X-row user data into X-column data;
   segmenting the X-column data and a weight vector to form N X-column data segmentation blocks and N weight vector segmentation blocks, wherein N corresponds to the number of CPUs callable in the apparatus;
   starting N threads to generate N sub-logistic regression gradients according to the N X-column data segmentation blocks, the N weight vector segmentation blocks, and the Y-row click-through data; and
   splicing the N sub-logistic regression gradients to form a full logistic regression gradient.

6. The logistic regression gradient calculation apparatus according to claim 5, wherein the apparatus comprises a plurality of apparatuses, and the processor is further configured to execute the set of instructions to cause the logistic regression gradient calculation apparatus to perform:
   aggregating full logistic regression gradients computed by the plurality of apparatuses to generate a final full logistic regression gradient.

7. The logistic regression gradient calculation apparatus according to claim 6, wherein the processor is further configured to execute the set of instructions to cause the logistic regression gradient calculation apparatus to perform:
   updating the weight vector according to the final full logistic regression gradient.

8. The logistic regression gradient calculation apparatus according to claim 5, wherein a number of columns in the X-row user data corresponds to a width of the weight vector.

9. A non-transitory computer readable medium that stores a set of instructions that is executable by at least one processor of a computer to cause the computer to perform a logistic regression gradient calculation method, comprising:
   acquiring training data including X-row user data and Y-row click-through data corresponding to the X-row user data;
   converting the X-row user data into X-column data;
   segmenting the X-column data and a weight vector to form N X-column data segmentation blocks and N weight vector segmentation blocks, wherein N corresponds to a number of CPUs callable in the computer;
   starting N threads to generate N sub-logistic regression gradients according to the N X-column data segmentation blocks, the N weight vector segmentation blocks, and the Y-row click-through data; and
   splicing the N sub-logistic regression gradients to form a full logistic regression gradient.

10. The non-transitory computer readable medium according to claim 9, wherein the computer comprises a plurality of computers, and the set of instructions that is executable by the at least one processor of the computer causes the computer to further perform:
    aggregating full logistic regression gradients computed by the plurality of computers to generate a final full logistic regression gradient.

11. The non-transitory computer readable medium according to claim 10, wherein the set of instructions that is executable by the at least one processor of the computer causes the computer to further perform:
    updating the weight vector according to the final full logistic regression gradient.

12. The non-transitory computer readable medium according to claim 9, wherein a number of columns in the X-row user data corresponds to a width of the weight vector.

* * * * *